United States Patent
Dürnholz et al.

(10) Patent No.: US 7,640,729 B2
(45) Date of Patent: Jan. 5, 2010

(54) METHOD FOR OPERATING A PARTICULATE FILTER SITUATED IN THE EXHAUST GAS AREA OF AN INTERNAL COMBUSTION ENGINE AND DEVICE FOR CARRYING OUT THE METHOD

(75) Inventors: Manfred Dürnholz, Oberstenfeld (DE); Carsten Becker, Kernen I.R. (DE); Markus Hernier, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 763 days.

(21) Appl. No.: 11/236,275

(22) Filed: Sep. 26, 2005

(65) Prior Publication Data

US 2006/0168947 A1 Aug. 3, 2006

(30) Foreign Application Priority Data

Sep. 25, 2004 (DE) .................. 10 2004 046 638

(51) Int. Cl.
*F01N 3/00* (2006.01)
(52) U.S. Cl. .............................. 60/289; 60/274; 60/276; 60/295; 60/297
(58) Field of Classification Search .................. 60/274, 60/276, 289, 295, 297, 304, 307, 311
See application file for complete search history.

(56) References Cited

U.S. PATENT DOCUMENTS

| | | | | |
|---|---|---|---|---|
| 3,828,552 A * | 8/1974 | Nishiguchi | ................... | 60/304 |
| 5,090,200 A * | 2/1992 | Arai | ............ | 60/286 |
| 5,305,602 A * | 4/1994 | Kojima et al. | ................. | 60/286 |
| 5,489,319 A * | 2/1996 | Tokuda et al. | ................. | 96/400 |
| 5,972,075 A * | 10/1999 | Fukuda et al. | ................. | 95/15 |
| 6,021,639 A * | 2/2000 | Abe et al. | ..................... | 60/297 |
| 6,471,918 B1 * | 10/2002 | Sherwood | .................. | 422/171 |
| 6,988,361 B2 * | 1/2006 | van Nieuwstadt et al. | ..... | 60/295 |
| 7,073,326 B2 * | 7/2006 | Cheong | ....................... | 60/295 |
| 2003/0230060 A1 | 12/2003 | Yahata et al. | | |
| 2004/0123584 A1 * | 7/2004 | Schaller | ....................... | 60/274 |
| 2004/0226288 A1 * | 11/2004 | Okugawa et al. | .............. | 60/295 |

FOREIGN PATENT DOCUMENTS

| | | |
|---|---|---|
| DE | 35 14 151 | 10/1986 |
| DE | 41 41 946 | 6/1993 |
| DE | 44 04 681 | 5/1995 |
| DE | 197 10 841 | 9/1998 |

(Continued)

*Primary Examiner*—Tu M Nguyen
(74) *Attorney, Agent, or Firm*—Kenyon & Kenyon LLP

(57) ABSTRACT

A method for operating a particulate filter situated in an exhaust gas area of an internal combustion engine and a device for carrying out the method are described. A measure of the particulate matter burn-off rate is detected for influencing and/or monitoring the particulate matter burn-off rate or for influencing and/or monitoring the particulate filter temperature. A secondary air flow supplied by a secondary air pump is blown into the exhaust gas area upstream from the particulate filter. The secondary air flow is determined as a function of the detected measure of the particulate matter burn-off rate. If necessary, the secondary air flow may be enriched by an oxygen flow or nitrogen flow supplied by an air separation unit. The method prevents the particulate filter from being damaged by an unacceptably high particulate matter burn-off rate or an unacceptably high particulate filter temperature.

13 Claims, 2 Drawing Sheets

FOREIGN PATENT DOCUMENTS

| | | |
|---|---|---|
| DE | 197 10 842 | 9/1998 |
| DE | 103 33 441 | 2/2004 |
| EP | 383187 | 8/1990 |
| EP | 389891 | 10/1990 |
| EP | 601287 | 6/1994 |
| EP | 1418316 | 5/2004 |

\* cited by examiner

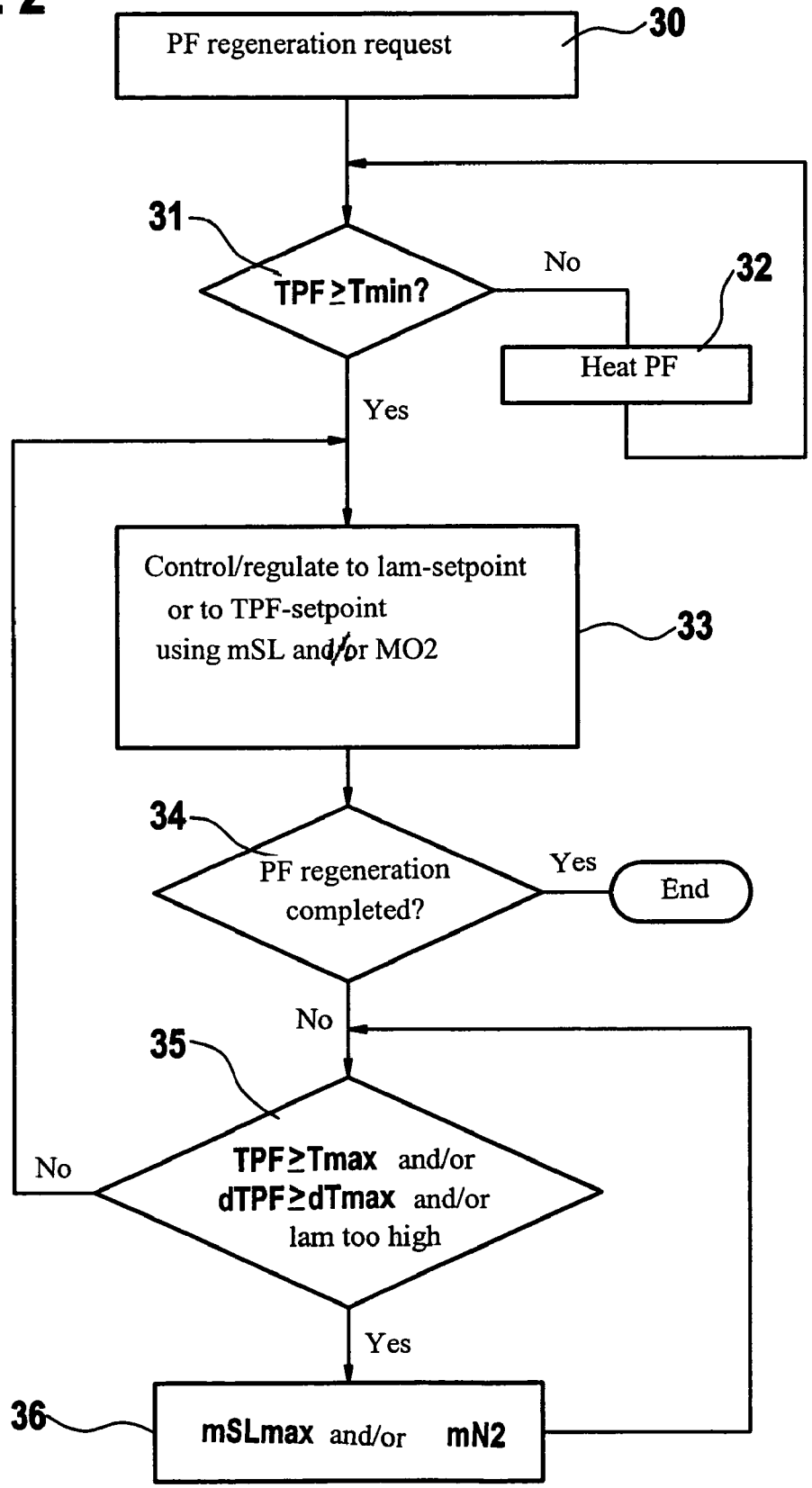

METHOD FOR OPERATING A PARTICULATE FILTER SITUATED IN THE EXHAUST GAS AREA OF AN INTERNAL COMBUSTION ENGINE AND DEVICE FOR CARRYING OUT THE METHOD

FIELD OF THE INVENTION

The present invention is directed to a method for operating a particulate filter situated in the exhaust gas area of an internal combustion engine and a device for carrying out the method.

BACKGROUND INFORMATION

A procedure for operating a particulate filter situated in the exhaust gas area of an internal combustion engine is known from German Published Patent Application No. 103 33 441, a lambda signal supplied by a lambda sensor being used as a measure of the particulate burn-off rate. The determined measure is used for monitoring the particulate matter burn-off temperature with the objective of preventing the particulate filter from overheating. A setpoint value is specified for the lambda signal or for a change in the lambda signal. If a discrepancy is detected between the setpoint value and the actual value, an intervention is made, for example, in the position of a throttle valve, the charging pressure of an exhaust-gas turbocharger or the determination of an exhaust gas recirculation rate. An embodiment provides a control element situated at the exhaust gas channel, via which fuel or an oxidant is fed to the exhaust gas flow.

A procedure for minimizing pollutants in exhaust gases of an internal combustion engine, in particular nitrogen oxides, is known from German Patent No. 44 04 681, which provides for an extensive removal of the nitrogen oxide component of the intake air of the internal combustion engine. The ambient air taken in by the internal combustion engine enters an air separation unit which makes air enriched with nitrogen available at one outlet and air enriched with oxygen at another outlet. The oxygen is obtained by an air separation unit containing a membrane which is only permeable to oxygen molecules.

The exhaust gas temperature is increased by the oxygen enrichment of the ambient air taken in by the internal combustion engine. An exhaust gas treatment device situated in the exhaust gas channel of the internal combustion engine, a catalytic converter for example, reaches a required minimum operating temperature more quickly after a cold start. At the same time, the fuel conversion in the internal combustion engine is improved so that the untreated carbon monoxide and hydrocarbon emissions are reduced.

The procedure for reducing pollutants in exhaust gases of an internal combustion engine known from German Published Patent Application No. 197 10 842, nitrogen oxides in particular, also provides for supplying the internal combustion engine with intake air enriched with oxygen. The focus is on the rapid attainment of the minimum operating temperature of a catalytic converter which is achieved using an operating point-dependent admixture of oxygen to the intake air. The air separation unit is situated in a bypass channel of the intake port of the internal combustion engine.

Another possibility for reaching the minimum operating temperature of a catalytic converter as rapidly as possible is described in German Published Patent Application No. 41 41 946 which provides for feeding secondary air into the exhaust gas area of the internal combustion engine as a function of the operating state of the internal combustion engine. The oxygen component of the secondary air may oxidize the oxidizable constituents contained in the exhaust gas such as carbon monoxide, hydrocarbons or hydrogen. The exothermic oxidation reaction may already occur in the exhaust manifold under appropriate conditions. If necessary, the oxidation reaction takes place in an oxidation catalytic converter. The exhaust gas which is additionally heated after the combustion process in the internal combustion engine indirectly heats an exhaust gas treatment device situated in the exhaust gas area, a catalytic converter or a particulate filter, for example, via the increased exhaust gas temperature. If necessary, it may be provided for the exhaust gas treatment device to contain a catalytic coating so that the oxidation reaction occurs directly in the exhaust gas treatment device to be heated.

The procedure known from German Published Patent Application No. 197 10 841 provides for a reduction of exhaust gas pollutants using a catalytic converter which is based on such a feed of secondary air into the exhaust gas area of an internal combustion engine. The secondary air is enriched by oxygen supplied by an air separation unit which contains a ceramic membrane permeable to oxygen molecules.

SUMMARY OF THE INVENTION

An object of the present invention is to specify a method for operating a particulate filter situated in the exhaust gas area of an internal combustion engine and a device for carrying out the method which in particular prevents the particulate filter from being damaged by an unacceptably high particulate matter burn-off rate or an unacceptably high particulate filter temperature.

The method of the present invention is based on detecting a measure of the particulate matter burn-off rate for influencing and/or monitoring the particulate matter burn-off rate or for influencing and/or monitoring the particulate filter temperature. The present invention provides for secondary air to be blown in upstream from the particulate filter and for the secondary air flow to be influenced as a function of the detected measure of the particulate matter burn-off rate.

The method of the present invention makes it possible to specifically influence and/or monitor the particulate matter burn-off rate in the particulate filter or to influence and/or monitor the particulate filter temperature by influencing the secondary air flow without further interventions in the control of the internal combustion engine. The secondary air flow, which is provided in any case for supplying an increased exhaust gas temperature if necessary, may also be used for specifically influencing the particulate matter burn-off rate.

The particulate matter burn-off rate of the particles deposited in the particulate filter is a function of the oxygen concentration in the exhaust gas and the particulate matter burn-off temperature, the temperature influence predominating. The measure for the particulate matter burn-off rate also reflects a measure of the particulate filter temperature, it being necessary to take the exhaust gas flow in the particulate filter into account. By adjusting the secondary air flow, it is possible to influence the oxygen content in the exhaust gas flow upstream from the particulate filter. Furthermore, the secondary air flow influences the temperature of the exhaust gas flow before it enters the particulate filter. Furthermore, the secondary air flow influences the exhaust gas flow within the particulate filter.

The individual influences of the secondary air flow at given exhaust gas parameters such as exhaust gas temperature, exhaust gas flow or exhaust gas oxygen content, may be stored in characteristics maps as characteristic lines or as functional relationships. These influences may be taken into account in advance in determining the influencing of the secondary air flow.

One embodiment provides for the secondary air flow to be enriched by an oxygen flow or nitrogen flow supplied by an air separation unit as a function of the detected measure of the particulate matter burn-off rate. The air separation unit described in the related art cited above makes it possible to supply an air flow enriched either with oxygen or with nitrogen, thereby allowing the particulate matter burn-off rate to be influenced more rapidly than in the case of ambient air.

One embodiment provides for the signal of a lambda sensor to be used as a measure of the particulate matter burn-off rate, the signal being a measure of the residual oxygen content of the exhaust gas. A wide range lambda sensor in particular makes it possible to supply a lambda signal when a high excess of oxygen is present in the exhaust gas, referring to the conditions of stoichiometric combustion.

Another embodiment provides for at least one measure of the particulate filter temperature to be used as a measure of the particulate matter burn-off rate. The particulate filter temperature may be at least approximately determined using a model. In one embodiment, a temperature sensor is provided that is for example situated downstream from the particulate filter. One embodiment provides for a correction of the determined measure of the particulate filter temperature as a function of the particulate filter exhaust gas flow occurring in the particulate filter.

A particularly advantageous embodiment provides for the maximum possible secondary air flow to be supplied for limiting the particulate filter temperature. Although this measure is used to introduce additional oxygen into the particulate filter, the increased exhaust gas flow in the particulate filter may cause the temperature of the vulnerable parts of the particulate filter to be reduced.

The device according to the present invention for operating an internal combustion engine initially relates to a control unit designed to carry out the method. The control unit preferably contains at least one electronic memory in which the process steps are stored as a computer program.

One embodiment provides for a secondary air pump propelled by an electric motor to be provided for supplying the secondary air flow. The secondary air pump makes it possible to supply the necessary pressure of the secondary air flow in order to overcome the exhaust gas backpressure.

Another embodiment provides for an air separation unit to supply the oxygen or nitrogen flow. Advantageously, the secondary air pump is situated upstream from the air separation unit in order to deliver a pressure differential which may be necessary for operating the air separation unit.

One embodiment provides for a temperature sensor to be situated downstream from the particulate filter for detecting the measure of the particulate filter temperature. Placement downstream from the particulate filter allows simple installation of the temperature sensor without interfering with the particulate filter.

Another embodiment provides for a pressure sensor to be provided upstream from the particulate filter. The signal of the pressure sensor may be used as a starting point for determining the differential pressure occurring in the particulate filter. The differential pressure is a measure of the load condition of the particulate filter.

BRIEF DESCRIPTION OF THE DRAWINGS

FIG. 2 shows a flow chart of a method according to the present invention.

DETAILED DESCRIPTION

Figure 1:
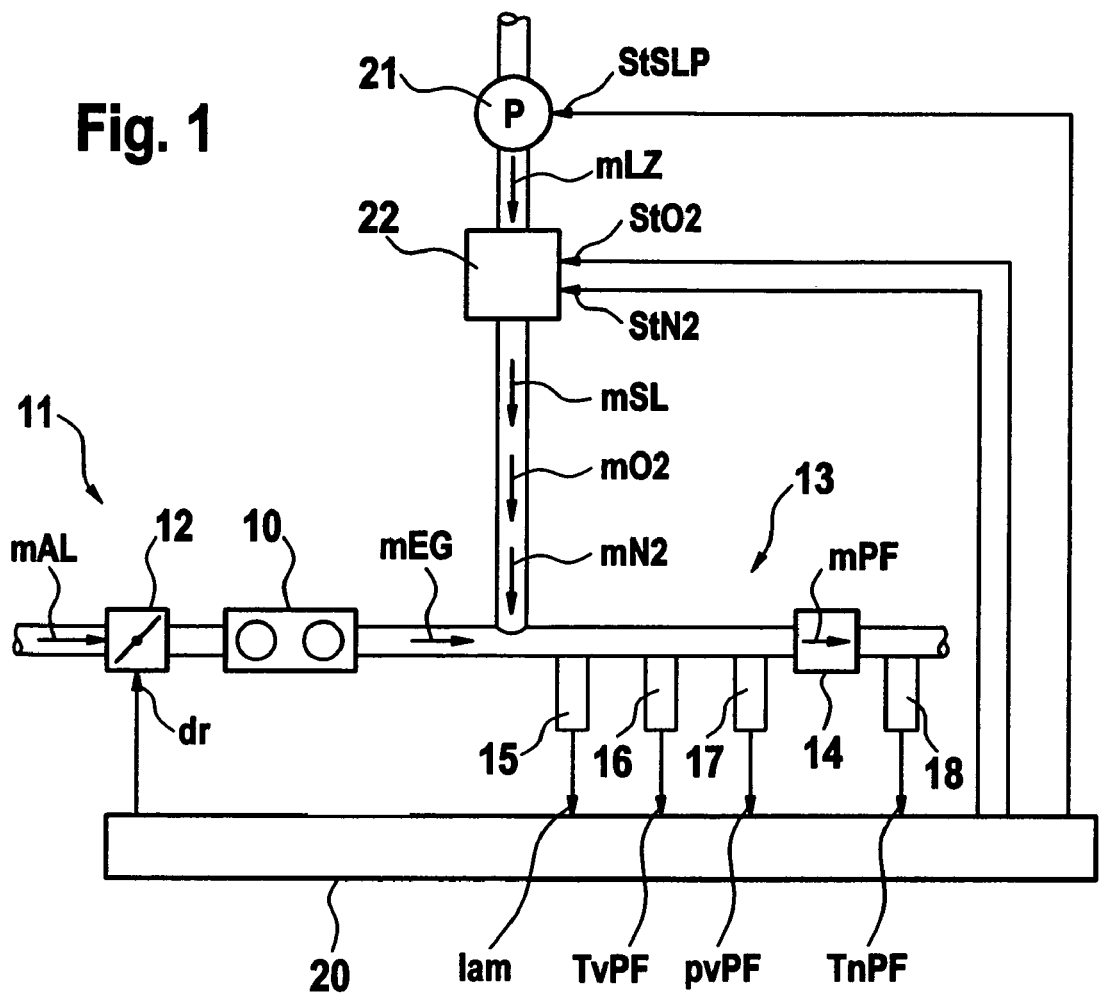
FIG. 1 shows a technical environment in which a method according to the present invention is performed.

FIG. 1 shows an internal combustion engine 10, a throttle valve 12 being situated in its intake side 11. An intake air flow mAL flows in intake side 11. A particulate filter 14, a lambda sensor 15, a first temperature sensor 16, a pressure sensor 17 and a second temperature sensor 18 are situated in an exhaust gas area 13 of internal combustion engine 10.

An exhaust gas flow mEG flows in exhaust gas area 13. A particulate filter exhaust gas flow mPF occurs in particulate filter 14.

Lambda sensor 15 delivers a lambda signal lam to a control unit 20. First temperature sensor 16 supplies a first temperature signal TvPF to control unit 20, second temperature sensor 18 supplies a second temperature signal TnPF, and pressure sensor 17 delivers a pressure signal pvPF.

A secondary air flow mSL, which is enriched with an oxygen flow mO2 or a nitrogen flow mN2, may be added to exhaust gas flow mEG. Secondary air flow mSL is supplied by a secondary air pump 21 which delivers an intake air flow mLZ to an air separation unit 22 which delivers oxygen flow mO2 and nitrogen flow mN2.

Control unit 20 delivers a throttle valve signal dr to throttle valve 12. Control unit 20 controls secondary air pump 21 using a secondary air pump control signal StSLP and air separation unit 22 using an oxygen flow control signal StO2 and a nitrogen flow control signal StN2.

FIG. 2 shows a flow chart that according to a first function block 30 starts with a particulate filter regeneration request. First query 31 checks whether particulate filter temperature TPF exceeds a minimum temperature Tmin. If this is not the case, particulate filter 14 is heated according to a second function block 32. If this is the case, a control or regulation to a specified lambda setpoint value lam-Setpoint or to a particulate filter temperature setpoint value TPF-Setpoint occurs using secondary air flow mSL and/or oxygen flow mO2 according to a third function block 33.

Second query 34 determines whether the particulate filter regeneration was completed. If this is the case, the process is terminated. If this is not the case, it is determined in a third query 35 if particulate filter temperature TPF exceeds a maximum temperature Tmax and/or a temperature change dTPF exceeds a temperature change maximum dTmax. If this is not the case, a return is made to third function block 33. If this is the case, secondary air flow mSL is increased to a secondary air flow maximum mSLmax and/or nitrogen flow mN2 is supplied.

The method of the present invention functions as follows:

Particulate filter 14 situated in exhaust gas area 13 stores the particulate matter that may be created during operation of internal combustion engine 10. After a predetermined load condition is attained, particulate filter 14 must be regenerated. The load condition may be determined, for example, using the differential pressure occurring in particulate filter 13. If necessary, particulate filter exhaust gas flow mPF may also be used to evaluate the load condition. The differential pressure occurring in particulate filter 14 may be determined approximately using pressure signal pvPF measured by pressure sensor 17 which reflects the exhaust gas pressure upstream from particulate filter 14 in combination with a pressure model of the exhaust gas system downstream from particulate filter 14.

After the particulate filter regeneration request is issued in first function block 30, a check is made in first query 31 if particulate filter temperature TPF at least equals minimum temperature Tmin. Minimum temperature Tmin indicates the temperature limit that must be exceeded so that an oxidation reaction of the particles deposited in the particulate filter with oxygen may proceed independently. Minimum temperature Tmin is, for example, 550° C.

If this is not the case, particulate filter 14 is heated according to second function block 32. The heating may be effected indirectly through an increased exhaust gas temperature. The exhaust gas temperature is increased by supplying secondary air flow mSL, the oxygen component of which oxidizes oxidizable fuel constituents in exhaust gas flow mEG, it being possible to introduce them into exhaust gas area 13 by at least one injection of fuel into exhaust gas area 13 downstream from the combustion process in internal combustion engine 10. Another possibility provides for a direct introduction of oxidizable constituents into exhaust gas area 13. The oxidation reaction may take place in an oxidation catalytic converter (not shown in greater detail) or directly in particulate filter 14 if an appropriate catalytic coating is provided in particulate filter 14. Via first temperature signal TvPF, first temperature sensor 16 supplies a measure of the exhaust gas temperature upstream from particulate filter 14, making it possible to avoid an unnecessary increase in the exhaust gas temperature.

If it is determined in first query 31 that minimum temperature Tmin required for starting the regeneration process has been reached, particulate filter 14 is regenerated according to third function block 33. To sustain the regeneration process, lambda signal lam supplied by lambda sensor 15 may be used at least as a measure of the particulate matter burn-off rate. Another measure of the particulate matter burn-off rate is particulate filter temperature TPF which, according to one embodiment, is detected indirectly via the exhaust gas temperature occurring downstream from particulate filter 14 and supplied by second temperature sensor 18 via second temperature signal TnPF. Particulate filter temperature TPF further from particulate filter exhaust gas flow mPF because the mean temperature of particulate filter 14 decreases at the same particulate matter burn-off rate as particulate filter exhaust gas flow mPF increases due to the cooling effect of the flowing exhaust gas. Particulate filter exhaust gas flow mPF is obtained from exhaust gas flow mEG which may be calculated, for example, from an available air signal (not shown in greater detail) which reflects intake air flow mAL, using, if necessary, a fuel injection signal (not shown in greater detail).

The particulate matter burn-off rate or particulate filter temperature TPF may be influenced, for example, by performing a controlling, or preferably regulating, operation to the specified lambda setpoint value lam-Setpoint or to the specified particulate filter temperature setpoint value TPF-Setpoint.

The influencing is achieved, for example, by a specific control of internal combustion engine 10, via which the oxygen content of exhaust gas flow mEG is changed. One measure is, for example, to change the position of throttle valve 12 via throttle valve signal dr and/or to change the fuel injection signal (not shown in greater detail) used to influence the fuel quantity metered to internal combustion engine 10.

According to the present invention, the influencing of the particulate matter burn-off rate or of particulate filter temperature TPF is provided by determining secondary air flow mSL and/or oxygen flow mO2 which may, if necessary, be supplemented by the measures within the engine. The oxygen contained in secondary air flow mSL makes it possible to increase the particulate matter burn-off rate. Secondary air flow mSL is preferably supplied by electrically propelled secondary air pump 21, the output of which may be changed by control unit 20 via secondary air pump control signal StSLP. Secondary air pump 21 may be connected directly to exhaust gas area 13 of internal combustion engine 10 without the interconnection of air separation unit 22.

A particularly advantageous embodiment provides for an admixture of oxygen flow mO2 to exhaust gas flow mEG. Oxygen flow mO2 makes an additional targeted control of the particulate matter burn-off rate in particulate filter 14 possible.

Oxygen flow mO2 is supplied by air separation unit 22 which in the exemplary embodiment shown is situated downstream from secondary air pump 21. This positioning of air separation unit 22 has the advantage that the differential pressure that may be needed for operating air separation unit 22 may be generated by secondary air pump 21 using intake air flow mLZ.

According to an embodiment not shown in greater detail, air separation unit 22 may be situated in intake side 11 of internal combustion engine 10, it being possible to supply the differential pressure either by a separate pump or based on the subatmospheric pressure prevailing in intake side 11.

Control unit 20 initiates the supply of oxygen flow mO2 via oxygen flow-control signal StO2. If air separation unit 22 is situated downstream from secondary air pump 21, oxygen flow mO2 occurs instead of secondary air flow mSL. The oxygen content of oxygen flow mO2 may amount to 25 percent, for example, compared to 21 percent of the ambient air as a function of the operation of air separation unit 22. The essential advantage is that the addition of oxygen flow mO2 to a minimal exhaust gas flow mEG makes it possible to maintain the particulate matter burn-off rate.

Second query 34 determines whether the particulate filter regeneration was completed. If this is the case, the process is terminated without further interventions. If this is not the case, it is determined in third query 35 if particulate filter temperature TPF exceeds maximum temperature Tmax or at least threatens to exceed it. In addition or as an alternative, it may be queried if a temperature change dTPF of particulate filter 14 exceeds specified temperature change maximum dTmax or at least threatens to exceed it. Temperature change dTPF may be, for example, the temperature gradient over time or at least a differential quotient of particulate filter temperature TPF. Furthermore, as an alternative, it may be determined whether lambda signal lam has an unacceptably high value. This situation may occur in particular in the low-load range of a diesel internal combustion engine, in particular during idling, when the oxygen concentration in exhaust gas flow mEG may rise, for example, to 16 percent. If particulate filter temperature TPF is used as a measure of the particulate matter burn-off rate, particulate filter exhaust gas flow mPF is preferably used as a correction quantity which has a cooling effect on particulate filter 14.

If no hazardous condition is present, a return may be made to third function block 33 and regeneration may be continued. If a hazardous condition is present or at least to be expected, at least one countermeasure is taken in function block 36.

A first countermeasure provides, for example, for the supply of nitrogen flow mN2 which is added to exhaust gas flow mEG. Nitrogen flow mN2 is supplied by air separation unit 22 as an alternative to oxygen flow mO2 by activating air separation unit 22 via nitrogen flow control signal StN2. The inert gas considerably slows down the oxidation reaction in particulate filter 14 as a function of the concentration.

As an alternative or in addition, it may be provided for secondary air flow mSL to be increased to a high value, preferably to secondary air flow maximum mSLmax. Although the increase of secondary air flow mSL introduces oxygen into particulate filter 14, which promotes the oxidation reaction and thus may increase the particulate matter burn-off rate, increasing particulate filter exhaust flow mPF causes the temperature of the endangered components of particulate filter 14 to be reduced. This measure accordingly reduces particulate filter temperature TPF. If it is determined in third query 35 that the hazardous condition for particulate filter 14 is no longer present, a return is made to third function block 33 according to which the regeneration process is continued.

What is claimed is:

1. A method for regenerating a particulate filter situated in an exhaust gas area of an internal combustion engine during the engine's operation, comprising:
    detecting a measure of a particulate matter burn-off rate for at least one of:
        at least one of influencing and monitoring a particulate matter burn-off rate, and
        at least one of influencing and monitoring a particulate filter temperature;
    controlling the operation of the internal combustion engine in a targeted manner for at least one of:
        at least one of influencing and monitoring the particulate matter burn-off rate, and
        at least one of influencing and monitoring the particulate filter temperature;
    wherein the controlling includes changing the oxygen content of the exhaust gas flow; and
    blowing a secondary air flow into the exhaust gas area upstream from the particulate filter, wherein the secondary air flow is influenced as a function of a detected measure of the particulate matter burn-off rate.

2. The method as recited in claim 1, further comprising:
    enriching the secondary air flow by one of an oxygen flow and a nitrogen flow supplied by an air separation unit as a function of the detected measure of the particulate matter burn-off rate.

3. The method as recited in claim 1, wherein a lambda signal of a lambda sensor is used as the measure of the particulate matter burn-off rate.

4. The method as recited in claim 1, wherein a maximum possible secondary air flow is specified for limiting the particulate filter temperature.

5. The method as recited in claim 1, wherein at least one measure of the particulate filter temperature is used as a measure of the particulate matter burn-off rate.

6. The method as recited in claim 5, further comprising:
    detecting the particulate filter temperature downstream from the particulate filter.

7. The method as recited in claim 5, further comprising:
    correcting the particulate filter temperature using a particulate filter exhaust gas flow occurring in the particulate filter.

8. A device for regenerating a particulate filter situated in an exhaust gas area of an internal combustion engine during the engine's operation, comprising:
    an arrangement for detecting a measure of a particulate matter burn-off rate for at least one of:
        at least one of influencing and monitoring the particulate matter burn-off rate, and
        at least one of influencing and monitoring a particulate filter temperature; and
    an arrangement for controlling the operation of the internal combustion engine in a targeted manner for at least one of:
        at least one of influencing and monitoring the particulate matter burn-off rate, and
        at least one of influencing and monitoring the particulate filter temperature;
    wherein the arrangement for controlling includes an arrangement to change the oxygen content of the exhaust gas flow; and
    an arrangement for blowing a secondary air flow into the exhaust gas area upstream from the particulate filter, wherein the secondary air flow is influenced as a function of the detected measure of the particulate matter burn-off rate.

9. The device as recited in claim 8, further comprising:
    a temperature sensor located downstream from the particulate filter and for detecting the particulate filter temperature.

10. The device as recited in claim 8, further comprising:
    a pressure sensor located upstream from the particulate filter.

11. The device as recited in claim 8, further comprising:
    a secondary air pump propelled by an electric motor and for supplying the secondary air flow.

12. The device as recited in claim 11, further comprising:
    an air separation unit for supplying one of an oxygen flow and a nitrogen flow.

13. The device as recited in claim 12, wherein the air separation unit is situated downstream from the secondary air pump.

* * * * *